US010563577B2

(12) United States Patent
Roberge

(10) Patent No.: US 10,563,577 B2
(45) Date of Patent: Feb. 18, 2020

(54) LOW ROTOR BOOST COMPRESSOR FOR ENGINE COOLING CIRCUIT

(71) Applicant: UNITED TECHNOLOGIES CORPORATION, Farmington, CT (US)

(72) Inventor: Gary D. Roberge, Tolland, CT (US)

(73) Assignee: United Technologies Corporation, Farmington, CT (US)

(*) Notice: Subject to any disclaimer, the term of this patent is extended or adjusted under 35 U.S.C. 154(b) by 907 days.

(21) Appl. No.: 15/242,674

(22) Filed: Aug. 22, 2016

(65) Prior Publication Data

US 2018/0051628 A1   Feb. 22, 2018

(51) Int. Cl.
| F02C 6/08 | (2006.01) |
| F02C 7/143 | (2006.01) |
| F02C 7/18 | (2006.01) |
| F02C 7/32 | (2006.01) |
| F02C 7/36 | (2006.01) |

(52) U.S. Cl.
CPC .............. *F02C 6/08* (2013.01); *F02C 7/143* (2013.01); *F02C 7/185* (2013.01); *F02C 7/32* (2013.01); *F02C 7/36* (2013.01); *Y02T 50/675* (2013.01)

(58) Field of Classification Search
CPC .. F02C 6/08; F02C 7/143; F02C 7/185; F02C 7/32; F02C 7/36; Y02T 50/675
See application file for complete search history.

(56) References Cited

U.S. PATENT DOCUMENTS

| 2,940,257 | A | * | 6/1960 | Kuhl | F02C 7/12 60/39.093 |
| 5,724,806 | A | * | 3/1998 | Homer | F02C 7/12 60/728 |
| 5,758,485 | A | | 6/1998 | Frutschi | |
| 5,782,076 | A | * | 7/1998 | Huber | F02C 7/08 415/115 |
| 6,089,010 | A | * | 7/2000 | Gross | F01D 5/08 60/39.25 |
| 6,134,880 | A | | 10/2000 | Yoshinaka | |
| 6,430,931 | B1 | | 8/2002 | Horner | |
| 6,968,701 | B2 | * | 11/2005 | Glahn | B64D 33/02 60/226.1 |

(Continued)

FOREIGN PATENT DOCUMENTS

| EP | 2554482 A1 | 2/2013 |
| EP | 2584169 A2 | 4/2013 |

(Continued)

OTHER PUBLICATIONS

European Search Report for European Patent Application No. 17187341.7 dated Jan. 17, 2018.

*Primary Examiner* — Jesse S Bogue
(74) *Attorney, Agent, or Firm* — Carlson, Gaskey & Olds, P.C.

(57) ABSTRACT

A gas turbine engine has a compressor section with a low pressure compressor and a high pressure compressor. The high pressure compressor has a downstream most location. A cooling air system includes a tap from a location upstream of the downstream most location. The tap passes air to a boost compressor and a heat exchanger, which passes the air back to a location to be cooled. The boost compressor is driven by a shaft which drives the lower pressure compressor.

16 Claims, 5 Drawing Sheets

(56) References Cited

U.S. PATENT DOCUMENTS

| | | | |
|---|---|---|---|
| 7,284,377 B2 | 10/2007 | Joshi et al. | |
| 8,096,747 B2 * | 1/2012 | Sengar | F01D 11/04 415/1 |
| 8,365,514 B1 * | 2/2013 | Kupratis | F02K 3/06 60/226.1 |
| 8,893,856 B2 * | 11/2014 | Frost | F01D 25/18 184/6.11 |
| 2004/0060278 A1 * | 4/2004 | Dionne | B64D 33/08 60/39.83 |
| 2009/0106978 A1 * | 4/2009 | Wollenweber | F02C 6/02 29/889.2 |
| 2013/0097992 A1 * | 4/2013 | Suciu | F02C 7/08 60/39.83 |
| 2015/0275758 A1 * | 10/2015 | Foutch | F02C 7/047 60/779 |
| 2016/0237905 A1 * | 8/2016 | Suciu | F02C 7/185 |

FOREIGN PATENT DOCUMENTS

| | | |
|---|---|---|
| EP | 3056716 A1 | 8/2016 |
| WO | 9502120 A1 | 1/1995 |

* cited by examiner

LOW ROTOR BOOST COMPRESSOR FOR ENGINE COOLING CIRCUIT

BACKGROUND OF THE INVENTION

This application relates to a boost compressor for supplying cooling air in a gas turbine engine, wherein the boost compressor is driven with a low speed rotor spool.

Gas turbine engines are known and typically include a fan delivering air into a compressor where it is compressed and delivered into a combustor. In the combustor, the air is mixed with fuel and ignited. Products of this combustion pass downstream over turbine rotors, driving them to rotate.

As can be appreciated, components in the gas turbine engine can become quite hot. Thus, it is known to supply cooling air for selected components as a means of reducing operating temperature and enhancing durability. Historically, gas turbine engines have included a low pressure compressor and a high pressure compressor. The cooling air, particularly for high pressure turbine airfoils, has typically been tapped downstream of the high pressure compressor.

However, the cooling loads on the gas turbine engine are becoming higher. One recent example includes a gear reduction between a fan drive turbine and the fan. With the inclusion of this gear reduction, turbines rotate at a faster rate and the cooling load is increased.

SUMMARY OF THE INVENTION

In a featured embodiment, a gas turbine engine has a compressor section with a low pressure compressor and a high pressure compressor. The high pressure compressor has a downstream most location. A cooling air system includes a tap from a location upstream of the downstream most location. The tap passes air to a boost compressor and a heat exchanger, which passes the air back to a location to be cooled. The boost compressor is driven by a shaft which drives the lower pressure compressor.

In another embodiment according to the previous embodiment, the boost compressor is located in a tail cone of the engine.

In another embodiment according to any of the previous embodiments, an output of the boost compressor delivers cooling air to a chamber outside of a combustor.

In another embodiment according to any of the previous embodiments, the heat exchanger includes a first heat exchanger positioned between the tap and the boost compressor and a second heat exchanger is positioned between the boost compressor and the output.

In another embodiment according to any of the previous embodiments, the boost compressor is driven directly by the shaft.

In another embodiment according to any of the previous embodiments, a speed increasing gearbox is positioned between the shaft and the boost compressor.

In another embodiment according to any of the previous embodiments, a clutch selectively disconnects the boost compressor from the shaft.

In another embodiment according to any of the previous embodiments, the clutch is located between the speed increasing gearbox and the boost compressor.

In another embodiment according to any of the previous embodiments, the clutch is positioned between the shaft and the speed increasing gearbox.

In another embodiment according to any of the previous embodiments, an output of the boost compressor delivers cooling air to a chamber outside of a combustor.

In another embodiment according to any of the previous embodiments, the heat exchanger includes a first heat exchanger positioned between the tap and the boost compressor and a second heat exchanger is positioned between the boost compressor and the output.

In another embodiment according to any of the previous embodiments, the boost compressor is driven directly by the shaft.

In another embodiment according to any of the previous embodiments, a speed increasing gearbox is positioned between the shaft and the boost compressor.

In another embodiment according to any of the previous embodiments, a clutch selectively disconnects the boost compressor from the shaft.

In another embodiment according to any of the previous embodiments, the clutch is located between the speed increasing gearbox and the boost compressor.

In another embodiment according to any of the previous embodiments, the clutch is positioned between the shaft and the speed increasing gearbox.

In another embodiment according to any of the previous embodiments, the boost compressor is driven directly by the shaft.

In another embodiment according to any of the previous embodiments, a speed increasing gearbox is positioned between the shaft and the boost compressor.

In another embodiment according to any of the previous embodiments, a clutch selectively disconnects the boost compressor from the shaft when an increase of pressure of the air is not necessary.

In another embodiment according to any of the previous embodiments, a second tap taps air downstream of the downstream most location and delivers the air to the location to be cooled.

These and other features may be best understood from the following drawings and specification.

DETAILED DESCRIPTION

Figure 1:
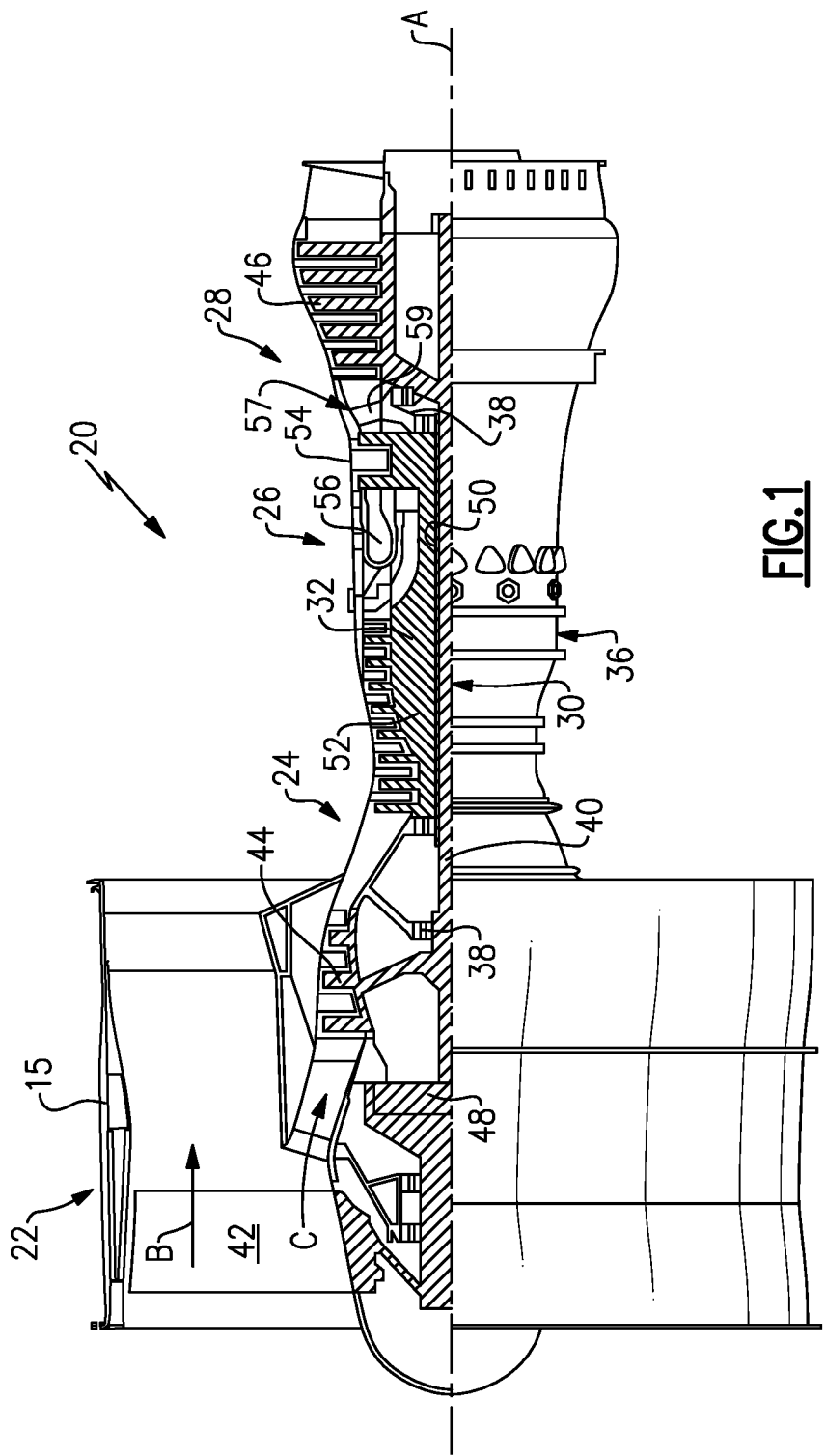
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(\text{Tram } ° \text{ R})/(518.7° \text{ R})]^{0.5}$. The "Low corrected fan tip speed" as disclosed herein according to one non-limiting embodiment is less than about 1150 ft/second (350.5 meters/second).

Figure 2:
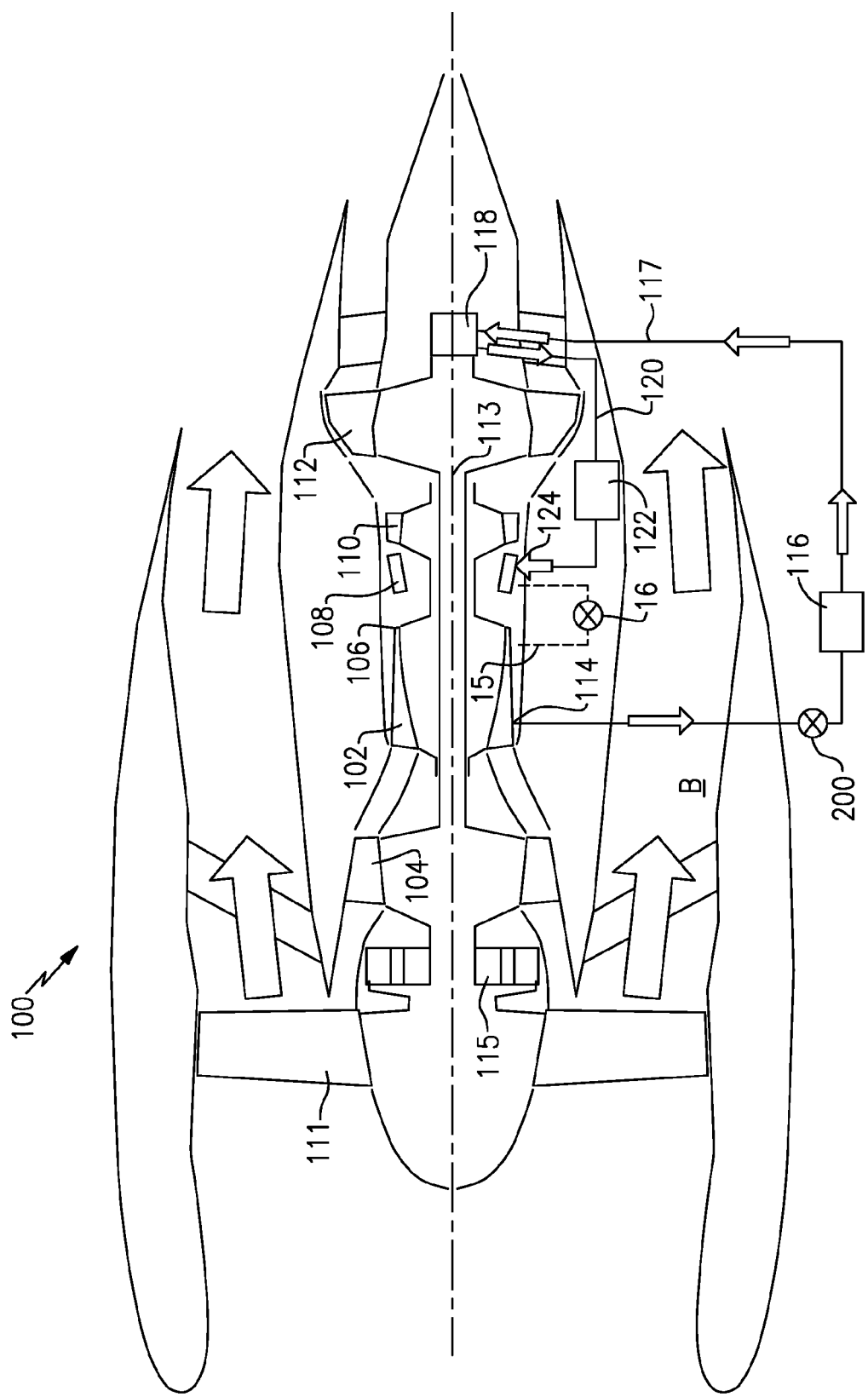
FIG. 2 shows a schematic of the features of this application.

FIG. 2 shows an engine 100 including a high pressure compressor 102 rotating with a high pressure turbine 110. A low pressure compressor 104 rotates with a low pressure turbine 112 through shaft 113. A fan rotor 111 is driven by low speed shaft 113 through a gear reduction 115. The low pressure compressor 104 and the low pressure turbine 112, along with shaft 113, could be said to form a low speed or low pressure spool.

In this embodiment, cooling air is tapped at 114 from a location upstream of the downstream end 106 of the high pressure compressor 102. While the air is tapped in an upstream portion of the high pressure compressor 102, it may also be tapped from the low pressure compressor 104. The air is passed through a heat exchanger 116 and into a line 117 leading to a low-spool driven boost compressor 118.

Applicant has recognized that utilizing cooler air from a location upstream of location 106 provides efficiency benefits to the gas turbine engine. One such benefit is that the impact on cycle thermal efficiency from the air from tap 114 will be much lower than the air at location 106 due to a reduction in work expended to provide additional compression in the high pressure compressor 102 between locations 114 and 106. As a result, the air at tap 114 will also be at a much lower temperature than the air at location 106.

While the heat exchanger 116 is shown outwardly of the engine 100, in practice, it may preferably be in the bypass duct B. Depending on the location of heat exchanger 116, heat rejection may be to the fan bypass stream B described above, the ambient free stream outside of the engine, or other sources.

It has been recognized that the air at the lower pressure from tap 114 alone or combine combined with losses from heat exchanger 116 may have insufficient pressure to move into a location adjacent the high pressure turbine for cooling components in that area. For example the pressure of tap 114 may lack the desired positive outflow margin (cooling air at a higher pressure than the pressure of air surrounding a turbine component) to provide effective cooling. As such, the boost compressor 118 will increase the pressure such that the air can be driven to perform its desired cooling function. A line 120 extends downstream from the compressor 118 through a second heat exchanger 122 and to an outlet 124 shown in a diffuser case chamber receiving a combustor 108. This air then passes to turbine 110. While two heat exchangers are shown, embodiments may only include one, or include more than two.

The boost compressor 118 is associated and driven by the low spool and shaft 113. Driving the compressor 118 with the low speed spool has less impact in terms of performance and operability impact certain applications than driving by the high speed spool.

Figure 3A:
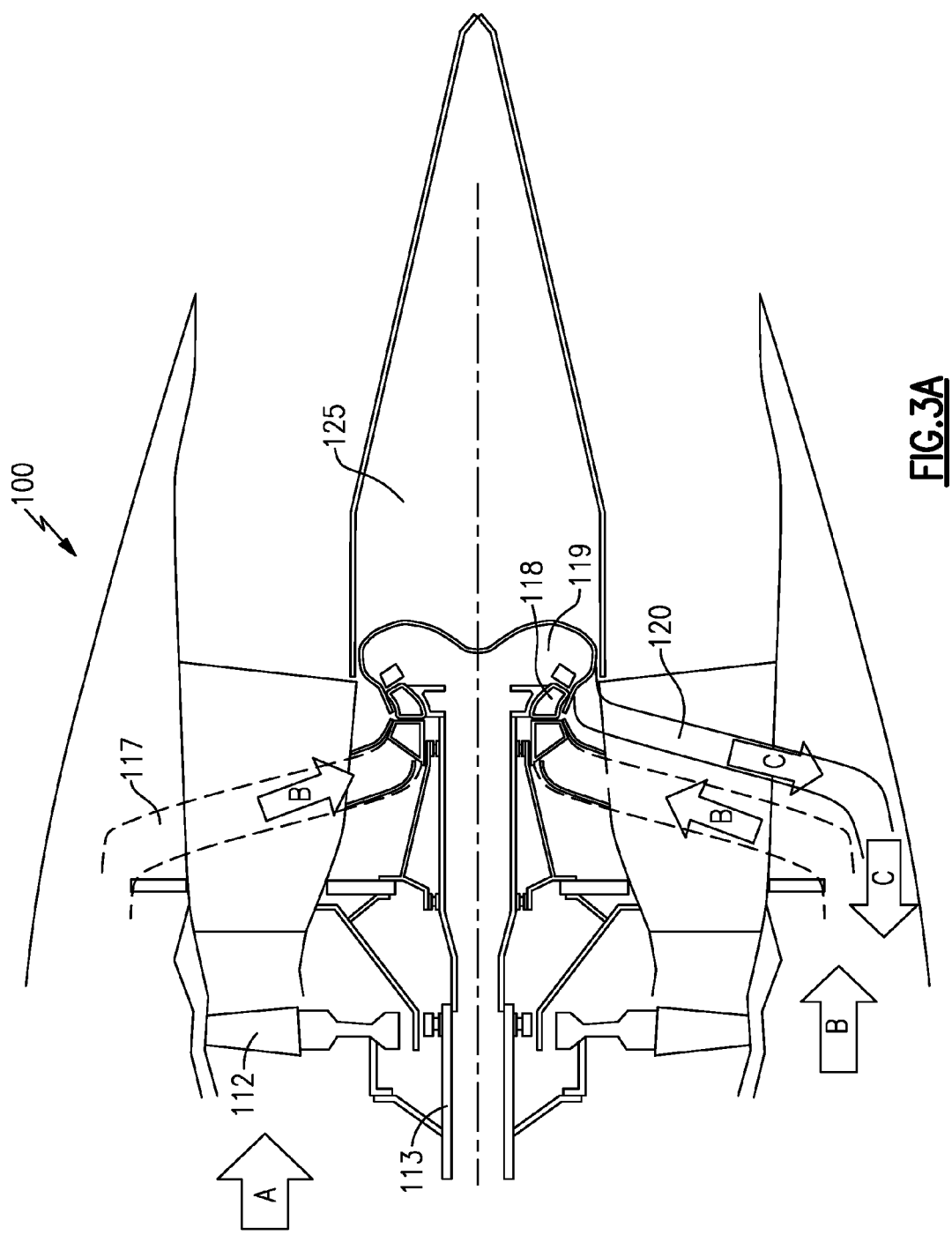
FIG. 3A shows a first embodiment.

FIG. 3A shows a detail of the first embodiment 100. The line 117 brings air to the boost compressor 118, and the boost compressor 118 rotates with a shaft 113 driven by the low spool. The air is compressed, collected in a discharge plenum 119, and discharged into an outlet line 120. Notably, the boost compressor is mounted in a tail cone 125 of the engine.

The combined effect of engine bleed at location 114, cooling via heat exchanger 116, additional pressure boost with compressor 118 and additional cooling via heat exchanger 122 results in the coolant flow introduced at location 124 being cooler (lower in temperature) and at an equivalent level of pressure than if taken directly from compressor discharge location 106. It should be noted that variation in design parameters including the location of bleed 114, system losses in heat exchangers 116 and 122, and line and ducting losses from 117 and 120, can be used to independently set both the pressure and temperature of flow introduced at location 124 in comparison to what could be obtained at location 106. As a result with the embodiment shown, turbine durability can be enhanced and/or cooling flow reduced through the use of a lower temperature coolant.

Figure 3B:
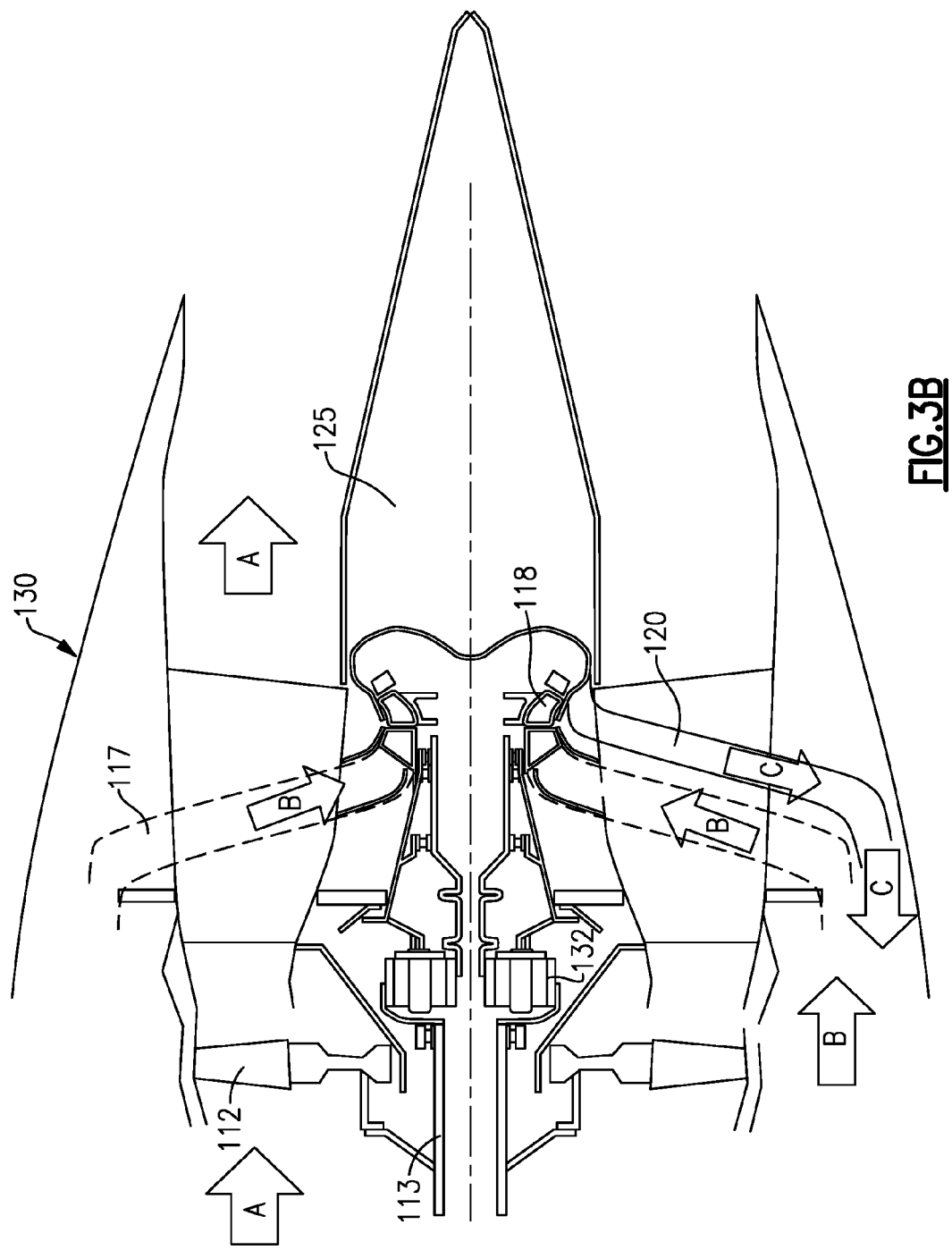
FIG. 3B shows a second embodiment.

FIG. 3B shows yet another embodiment 130. Embodiment 130 is similar to the embodiment shown in FIG. 3A, however, a speed increasing gearbox 132 takes in the speed from the shaft 113 and increases the speed of the boost compressor 118. With this embodiment, even though the lower speed shaft 113 is supplying the drive input, the boost compressor 118 is still operable to rotate at faster speeds as determined by the gear ratio of gearbox 132.

Figure 3C:
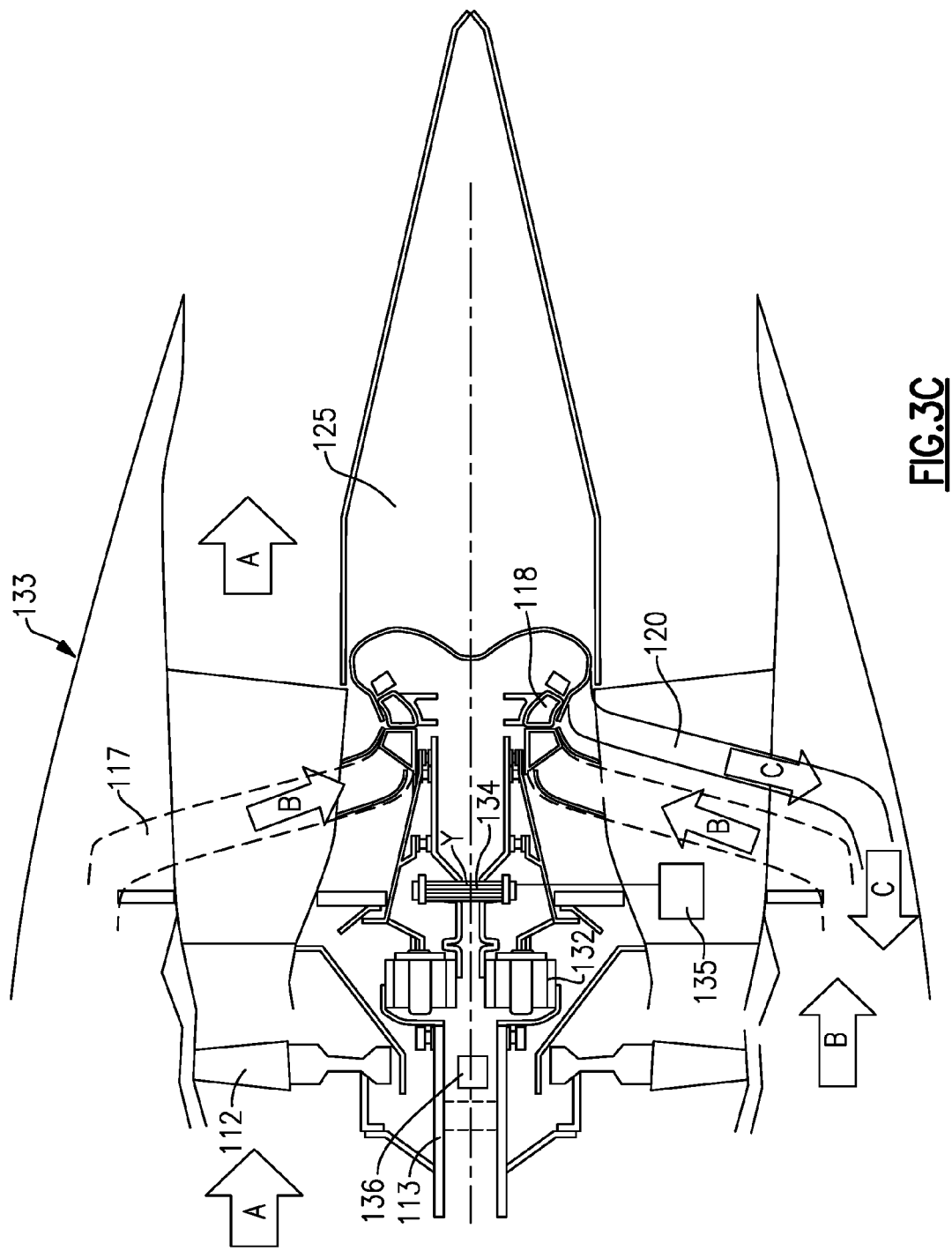
FIG. 3C shows yet another embodiment.

FIG. 3C shows yet another embodiment 133. In embodiment 133, a speed increasing gearbox 132 is included. A clutch 134 is also included under the control of a controller 135. The clutch 134 may be opened or rotational power transfer disengaged at certain conditions wherein the boost compressor is not needed or if this element of the engine's overall cooling circuit is modulated. As an example, at lower power operation, the boost compressor may not be necessary and by opening the clutch any parasitic drain on the efficiency of the overall engine by the boost compressor 118 will be reduced.

As shown schematically at 136, the clutch may be mounted either upstream or downstream of the speed increasing gearbox 132.

Returning to FIG. 2, as another option, the turbine cooling system uses a mixture of air from location 106 through tap 15 to 124 and the portion of air from line 114 is turned off by valve 200, or otherwise varied. A valve 16 controls the volume of air from location 106. The control can also modulate the respective volumes. Of course, a heat exchanger, etc., may be included on tap 15.

The clutch can be opened at low power operation. Such operation would typically be a condition when air from the tap 15 can be relied upon. The temperature of the air at location 106 is relatively low, as is the cooling load at location 124. By disengaging the clutch, some fuel efficiency is achieved.

The clutch would be engaged as the overall pressure ratio of the compression system increases and the compressor discharge air temp also increases. This would also roughly track with increased turbine temperature and associated cooling demands. The cooled cooling air in the proposed system (tap 106) combined with HPC discharge (tap 15) would mix and provide a lower coolant temp than if compressor discharge alone were used. Conditions here would be higher power operation including takeoff, climb to altitude and perhaps cruise.

Such a condition would be associated with increased cooling loads due to increased turbine temperatures. Mixing the two air flows can be utilized to provide a lower coolant temperature under some conditions.

The decision to engage or disengage the clutch, and to mix the two air flows, may be based on measurement or control system synthesis (calculation) of compressor discharge temperatures, estimated air temperatures from each tap, and turbine temperatures. A control logic can decide the best combination of each of the disclosed options.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   a compressor section having a low pressure compressor and a high pressure compressor, and said high pressure compressor having a downstream most location;
   a cooling air system including a tap from a location upstream of said downstream most location, said tap connected to pass air to a boost compressor and a heat exchanger;
   said boost compressor connected to pass the air to a location to be cooled, and said boost compressor being driven by a shaft which drives said lower pressure compressor; and
   wherein said boost compressor is located in a tail cone of said engine.

2. The gas turbine engine as set forth in claim 1, wherein an output of said boost compressor delivers cooling air to a chamber outside of a combustor.

3. The gas turbine engine as set forth in claim 1, wherein said heat exchanger includes a first heat exchanger positioned between said tap and said boost compressor and a second heat exchanger is positioned between said boost compressor and said output.

4. The gas turbine engine as set forth in claim 3, wherein said boost compressor is driven directly by said shaft.

5. The gas turbine engine as set forth in claim 3, wherein a speed increasing gearbox is positioned between said shaft and said boost compressor to increase the speed of said boost compressor in relation to said shaft.

6. The gas turbine engine as set forth in claim 5, wherein a clutch selectively disconnects said boost compressor from said shaft.

7. The gas turbine engine as set forth in claim 6, wherein said clutch is located between said speed increasing gearbox and said boost compressor.

8. The gas turbine engine as set forth in claim 6, wherein said clutch is positioned between said shaft and said speed increasing gearbox.

9. The gas turbine engine as set forth in claim 1, wherein a clutch selectively disconnects said boost compressor from said shaft.

10. The gas turbine engine as set forth in claim 9, wherein said clutch is located between said speed increasing gearbox and said boost compressor.

11. The gas turbine engine as set forth in claim 9, wherein said clutch is positioned between said shaft and said speed increasing gearbox.

12. The gas turbine engine as set forth in claim 1, wherein said boost compressor is driven directly by said shaft.

13. The gas turbine engine as set forth in claim 1, wherein a speed increasing gearbox is positioned between said shaft and said boost compressor to increase the speed of said boost compressor in relation to said shaft.

14. The gas turbine engine as set forth in claim 13, wherein a clutch selectively disconnects said boost compressor from said shaft when an increase of pressure of the air is not necessary.

15. The gas turbine engine as set forth in claim 1, wherein a second tap taps air downstream of the downstream most location and delivers said air to said location to be cooled.

16. A gas turbine engine comprising:
- a compressor section having a low pressure compressor and a high pressure compressor, and said high pressure compressor having a downstream most location;
- a cooling air system including a tap from a location upstream of said downstream most location, said tap connected to pass air to a boost compressor and a heat exchanger;
- said boost compressor connected to pass the air to a location to be cooled, and said boost compressor being driven by a shaft which drives said lower pressure compressor; and
- wherein said boost compressor is driven directly by said shaft.

\* \* \* \* \*